May 20, 1958     N. B. BLAKE ET AL     2,835,444
MULTIPLICATION CIRCUIT

Filed March 18, 1955

$$(1) \quad (-x-y)T_c + \frac{T_c}{4K}(K+x+y)^2$$

$$(2) \quad (x-y)T_c - \frac{T_c}{4K}(K+x-y)^2$$

$$(3) \quad (x+y)T_c + \frac{T_c}{4K}(K-x-y)^2$$

$$(4) \quad (-x+y)T_c - \frac{T_c}{4K}(K-x+y)^2$$

$$(A) \quad \frac{2xyT_c}{K}$$

$$(B) \quad \frac{2}{K}xy$$

INVENTORS
NORMAN B. BLAKE &
WILLIAM H. COX
BY
ATTORNEYS

May 20, 1958    N. B. BLAKE ET AL    2,835,444
MULTIPLICATION CIRCUIT

Filed March 18, 1955    2 Sheets-Sheet 2

INVENTORS
NORMAN B. BLAKE &
BY WILLIAM H. COX

ATTORNEYS

United States Patent Office 2,835,444
Patented May 20, 1958

2,835,444

MULTIPLICATION CIRCUIT

Norman B. Blake and William H. Cox, Beaumont, Tex., assignors to Sun Oil Company, Philadelphia, Pa., a corporation of New Jersey Application March 18, 1955, Serial No. 495,264

4 Claims. (Cl. 235—61)

This invention relates to a multiplication circuit of high accuracy type and with a large output range together with four quadrant operation, i. e., signals of both polarities are handled with the correct assignment of sign to the output.

Many types of multiplication circuits have been proposed but have various drawbacks in practical use. Those which depend upon the characteristics of thermionic tubes involve approximations placing limits on their accuracy. Others are not well adaptable to four quadrant operation. Furthermore, in general, the multiplication circuits are elaborate and costly.

One object of the present invention is the provision of a multiplication circuit which is very simple and due to the simplicity of its components may be of very small physical size. In fact, the multiplication circuit proper involves only a set of eight resistors together with four crystal rectifiers and a capacitance and, accordingly, may be quite minute. Involved in its operation is the necessity for providing a triangular wave, but the generator for such wave may be used to supply a large number of multiplication circuits having the simple constitution just indicated.

A further object of the invention relates to the provision of a multiplication circuit capable of four quadrant operation, i. e., the multiplication of positive and negative quantities with the production of a properly signed output.

Another object of the invention is to provide a symmetrical circuit with a balanced carrier such that there is substantially no output from the carrier alone.

Still another object of the invention is to provide a multiplication circuit of large dynamic range and high accuracy.

The attainment of these objects, as well as others particularly relating to details of construction and operation, will become apparent from the following description read in conjunction with the accompanying drawings, in which.

Figures 1, 4:
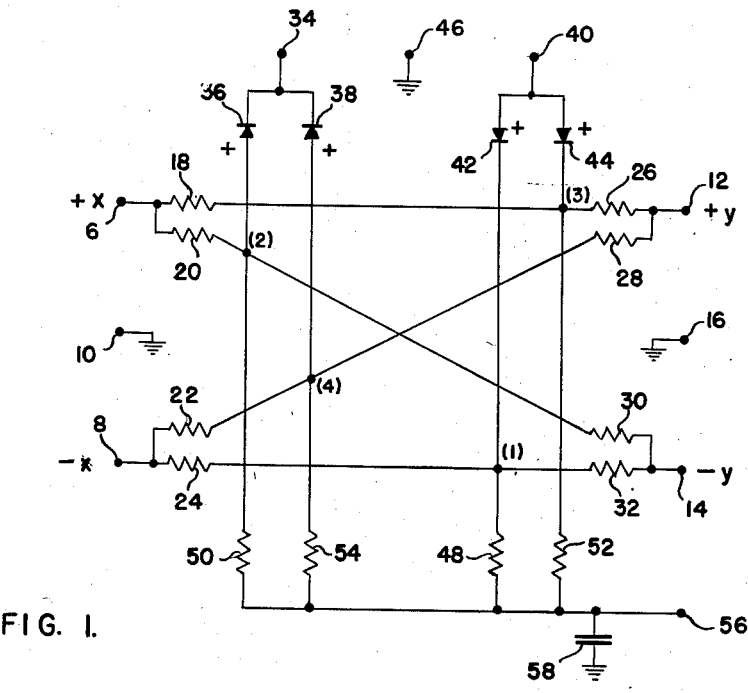
Figure 1 is a wiring diagram showing the multiplication circuit in the preferred form contemplated by the invention.
Figure 3:
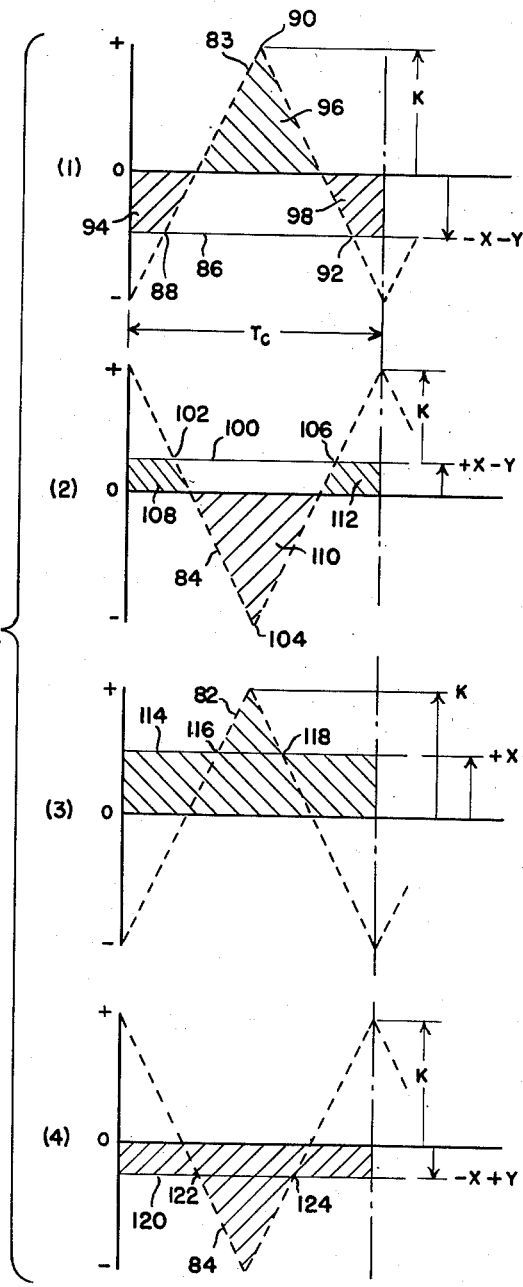

Figure 3 comprises a series of graphs illustrative of the characteristics of operation involved; and Figure 4 comprises a set of expressions indicative of the operation of the multiplying circuit.

Referring to Figure 1, a group of four terminals are respectively designated by 1, 2, 3 and 4. These numeral designations are also used in Figure 3 to indicate respective graphs representative of operations at the corresponding terminals, and are used in Figure 4 in association with expressions characterizing the respective terminals.

Input terminals for one variable to be multiplied, $x$, are indicated at 6, 8 and 10, and similar terminals for the input of the second variable to be multiplied, $y$, are indicated at 12, 14 and 16. The inputs are in the form of potentials which may vary with time and which it may be desired to multiply to secure a product as a function of time. Each multiplier is first transformed in conventional fashion into a push-pull input with its center grounded. As indicated in Figure 1, the terminal 6 receives a $+x$ input while the terminal 8 receives a $-x$ input, the center of the input being grounded at the terminal 10. Similarly, terminal 12 receives a $+y$ input and terminal 14 a $-y$ input, the center being grounded at terminal 16. The positive and negative indications do not mean that the input signals at the respective terminals are always positive (or negative). They mean only that the functions to be multiplied have their simultaneous values to be multiplied applied at terminals 6 and 12, respectively, while at terminals 8 and 14 these functions are applied with reverse polarity. As will be clear, both of the functions indicated as $+x$ and $+y$ may vary between positive and negative limits so long as there is satisfied a criterion which will be better made evident hereafter.

Terminal 6 is connected to terminals 3 and 2, respectively, through resistors 18 and 20. Terminal 8 is connected to terminals 4 and 1, respectively, through resistors 22 and 24. Terminal 12 is connected to terminals 3 and 4, respectively, through resistors 26 and 28. Terminal 14 is connected to terminals 2 and 1, respectively, through resistors 30 and 32.

A terminal 34 is connected through diodes 36 and 38, respectively, to terminals 2 and 4. A terminal 40 is connected through diodes 42 and 44, respectively, to terminals 1 and 3.

The terminals 1, 2, 3 and 4 are respectively connected through resistors 48, 50, 52 and 54 to an output terminal 56 between which and ground there is located a capacitor 58 of suitable value for the type of operation desired.

The diodes 36, 38, 42 and 44 are desirably of the germanium crystal type having quite high resistance to reverse flow but quite low resistance to forward flow of current. As indicated in Figure 1, the cathodes of the diodes 36 and 38 are connected to terminal 34, whereas the anodes of diodes 42 and 44 are connected to the terminal 40.

Resistors 18, 20, 22, 24, 26, 28, 30 and 32 are of relatively high resistance compared with the low forward resistance of the diodes described. The resistances of the resistors of this group are all equal.

The resistors 48, 50, 52 and 54 have equal resistances which are high compared with the resistances of the resistors of the group 18—32. This prevents conditions at the terminals 1, 2, 3 and 4 from being substantially affected by the potential existing at output terminal 56, i. e., the ungrounded terminal of capacitor 58.

Figure 2:
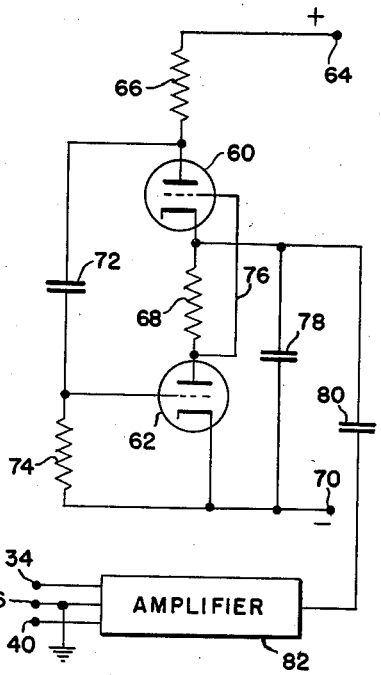
Figure 2 is a wiring diagram illustrating a particular type of triangular wave generator used in connection with the multiplication circuit.

For operation of the multiplying circuit there must be provided to the terminals 34 and 40 a push-pull type of signal with respect to ground, the signal being of triangular form. As will be evident from the following description of the operation, the nature of the triangular wave which is thus provided is not fundamentally important, and it might well be of sawtooth type, but it is advantageous to utilize a triangular wave of isosceles type since such a wave involves a minimum harmonic content as compared with other triangular waves and it is desirable to minimize the harmonic content to avoid necessity for elaborate filtering of high frequency output. A symmetrical or isosceles wave may be provided from a Fruhauf oscillator such as is described in "Time Bases" by Puckle, page 36, John Wiley & Sons, Inc., 1951. An oscillator of this type is shown in Figure 2 and comprises triodes 60 and 62, the anode of triode 60 being connected to a positive potential supply terminal 64 through resistor 66, while the cathode of triode 62 is connected to the negative supply terminal 70. The cathode of triode 60 is connected to the anode of triode 62 through resistor 68. A capacitor 72 is connected between the anode of triode 60 and the grid of triode 62, which grid is connected to the negative supply terminal 70 through resistor 74. The anode of triode 62 is directly connected to the grid of triode 60 through connection 76. A capacitor 78 connects the cathode of triode 60 to the negative supply terminal. The output, taken from the cathode of triode 60, may be delivered through a capacitor 80 to an amplifier 82 arranged in conventional fashion to provide a push-pull output to the terminals 34 and 40. The oscillator thus described involves theoretically exponential rises and falls of its output wave. However, if the oscillator is so operated that the swing of its output wave is quite small compared to the potential between terminals 64 and 70, a very close approximation to an isosceles triangular wave may be produced. The circuit shown in Figure 2 may, of course, be made more elaborate, for example, by the use of constant current pentodes, to even further closely approximate a theoretically perfect triangular wave. Such more elaborate circuitry is justified, however, only if extreme accuracy of multiplication is desired.

The condition for proper operation of the multiplication circuit is that the sum of the absolute values of the maxima of the inputs $x$ and $y$ should be less than the amplitude $k$ of the triangular wave indicated at 83 and 84 in Figure 3. (83 and 84 represent, of course, the same wave, the 180° reversal in phase merely indicating the push-pull presentation of the wave signal to the terminals 40 and 34.)

For proper operation, the period $T_c$ of the triangular wave must be short in comparison with the times for appreciable variations in the inputs $x$ and $y$. If, for example, the inputs $x$ and $y$ are periodic, the triangular wave should have a fundamental frequency much greater than theirs. The operation may be best described by considering that through a single period $T_c$ of the triangular wave the inputs $x$ and $y$ remain substantially constant.

Reference may now be made particularly to Figure 3 in which the several diagrams illustrative of conditions arising at the terminals 1, 2, 3 and 4 are presented on the assumption that the value of $x$ under consideration is greater than the value of $y$ simultaneously involved, both being positive. As will be evident after considering the following discussion, the operation is as desired even if these assumed conditions do not exist, providing only that the sum of the absolute values of the maxima of $x$ and $y$ is less than K as above mentioned.

Considering first the graph corresponding to terminal 1, it will be evident from Figure 1 that so long as diode 42 is non-conducting, there will be applied to terminal 1 a potential $-x-y$, indicated in the diagram at 86. Beginning at zero time, as indicated, the triangular wave applied at terminal 40 has its maximum negative value, and it will be evident that the diode 42 will then be cut off until the potential at terminal 40 rises above that represented at 86. The point at which conduction of the diode occurs is indicated at 88 and, up to this time, the potential at terminal 1 will accordingly be $-x-y$. As soon as the diode 42 conducts, because of the low resistance of the diode, the potential at the terminal 1 will be that of the terminal 40. (It is to be assumed that the inputs to all of the terminals involved have very low impedance so that the resistances 18—32 are, in comparison, high and do not affect the signal supplies).

Following point 88 the potential of terminal 1 will, accordingly, rise through zero to the positive maximum 90 of the triangular wave and then will pass through zero to the point 92, corresponding to 88, where the diode 42 is again cut off, the potential at terminal 1 thereafter, for the remainder of the duration of the cycle, being that imposed from terminals 8 and 14, namely, $-x-y$. The shading in the diagram corresponding to terminal 1 in Figure 3 indicates the waveform which thus appears at terminal 1, the areas being shaded from upper left to lower right to indicate a positive condition, and from lower left to upper right to indicate a negative condition. Since, as will appear, averaging is ultimately involved, the shaded areas themselves are actually of significance. The shaded areas, taking due regard of sign, will have the value in a single period indicated at 1 in Figure 4. That this is true will be evident from inspection.

The diagram (2) in Figure 3 similarly indicates the conditions existing in the same cycle at terminal 2. Here, at zero time, the diode 36 is cut off by reason of the positive value of the triangular wave in excess of the potential imposed at terminal 2 from the terminals 6 and 14, i. e., $x-y$. This potential level is indicated at 100. The diode 36 becomes conductive at the time indicated at 102 and then the potential at terminal 2 is due to the input at terminal 34 which goes through zero to the maximum negative value 104 and then rises to the point 106 where the diode 36 is again cut off. The waveform at terminal 2 is accordingly indicated by the shaded areas 108, 110 and 112 and inspection will reveal that these areas are given by the expression 2 in Figure 4.

The diagram (3) in Figure 3 similarly indicates conditions existing at terminal 3. Here at zero time the triangular wave has its negative maximum value, and, consequently, diode 44 is cut off by reason of the bias indicated at 114 applied to terminal 3 from terminals 6 and 12, namely, $x+y$. The diode 44 remains cut off until the condition 116 is reached whereupon it becomes conductive applying to the terminal 3 the positive peak of the wave applied at terminal 40, until the condition 118 is reached whereupon cut off again occurs. The entire area involved is, in this case, positive.

The diagram at (4) indicates what occurs at terminal 4. Here the bias applied to the terminal from the signals at terminals 8 and 12 is indicated at 120 and has the value $-x+y$. It will be clear that the diode 38 is cut off except between the points 122 and 124, and that the area involved in this diagram is entirely negative.

The contribution to the ungrounded terminal of capacitor 58 from the terminals 1, 2, 3 and 4 resulting from the above is measured, for a single cycle, and due to the summing action of the arrangement of resistors 48, 50, 52 and 54 to the sum of the areas in the diagrams in Figure 3 which are, respectively, as given in the correspondingly numbered expressions in Figure 4. Summing of these last expressions gives the single product term indicated at (A) in Figure 4, and the average potential appearing at terminal 56 is that indicated at (B) in Figure 4, consisting of the product $xy$ multiplied by a constant involving the constant amplitude of the triangular wave.

In the foregoing the assumption was made that the signals to be multiplied remained constant during the period of a single cycle of the triangular wave. It will be evident that if the period of the triangular wave is short compared with variations in $x$ and $y$, and if the time constant of the RC circuit involving capacitor 58 and its feeding resistors is small compared with the period of substantial changes of $x$ and $y$ but large compared with the period $T_c$, the product (B) will be delivered at the terminal 56 as a function of time which represents closely the instantaneous products of the variables $x$ and $y$.

By reason of the introduction of a balanced carrier and the symmetry of the circuit with respect to this input, the rectification involved is not attended with the introduction into the output of a D. C. potential derived from the carrier alone.

By reason of the balanced arrangement, there is also eliminated substantially all carrier component at the output, the capacitor 58 chosen for the desired time constant as indicated above for instantaneous multiplication being generally sufficient to suppress any residual ripple to a satisfactory extent. The upper frequency limit of operation for the input signals is imposed by the shunt capacitances of the diodes and by the carrier frequency used.

It will be evident that the multiplication circuit may form an element of a circuit for performing division through the comparison of its output with a dividend in a differential amplifier the output of which provides a quotient to one of the pair of input signal terminals, the divisor being applied to the other pair of input signal terminals. By this expedient, four quadrant division as well as four quadrant multiplication may be attained.

It will, of course, be evident, that if the same signals are applied at $x$ and $y$, the circuit is an accurate squaring circuit.

What is claimed is:

1. A multiplication circuit comprising a pair of carrier input terminals, means for applying a triangular carrier wave between said terminals, a pair of diodes having their anodes connected to one of said terminals, a second pair of diodes having their cathodes connected to the other of said terminals, the sides of said diodes opposite those connected to said terminals being connected to four individual biasing terminals, means for applying to said biasing terminals signals respectively equal to the positive and negative sums and differences of signals to be multiplied, and means for summing and averaging potentials appearing at said biasing terminals.

2. A multiplication circuit comprising a pair of carrier input terminals, means for applying a triangular carrier wave between said terminals, a pair of diodes having their anodes connected to one of said terminals, a second pair of diodes having their cathodes connected to the other of said terminals, the sides of said diodes opposite those connected to said terminals being connected to four individual biasing terminals, means for applying to said biasing terminals through an array of equal resistors signals respectively equal to the positive and negative sums and differences of signals to be multiplied, and means for summing and averaging potentials appearing at said biasing terminals.

3. A multiplication circuit comprising a pair of carrier input terminals, means for applying a triangular carrier wave between said terminals, a pair of diodes having their anodes connected to one of said terminals, a second pair of diodes having their cathodes connected to the other of said terminals, the sides of said diodes opposite those connected to said terminals being connected to four individual biasing terminals, means for applying to said biasing terminals through an array of equal resistors, having resistance values large in comparison with the forward resistances of said diodes, signals respectively equal to the positive and negative sums and differences of signals to be multiplied, and means for summing and averaging potentials appearing at said biasing terminals.

4. A multiplication circuit comprising a pair of carrier input terminals, means for applying a triangular carrier wave between said terminals, a pair of diodes having their anodes connected to one of said terminals, a second pair of diodes having their cathodes connected to the other of said terminals, said diodes being connected to four individual biasing terminals, means for applying to said biasing terminals signals respectively equal to the positive and negative sums and differences of signals to be multiplied, and means for summing and averaging potentials appearing at said biasing terminals.

References Cited in the file of this patent

UNITED STATES PATENTS 2,674,409     Lakatos _____ Apr. 6, 1954

OTHER REFERENCES

A Simple Electronic Multiplier (Norswarthy), Electronic Engineer (London), No. 26, pages 72–75, February 1954.